(12) United States Patent
Duz

(10) Patent No.: US 11,674,787 B2
(45) Date of Patent: Jun. 13, 2023

(54) STUD CHECKER AND DRAPERY ROD HANGING TEMPLATE KIT

(71) Applicant: Bekir Duz, Camillus, NY (US)

(72) Inventor: Bekir Duz, Camillus, NY (US)

( * ) Notice: Subject to any disclaimer, the term of this patent is extended or adjusted under 35 U.S.C. 154(b) by 420 days.

(21) Appl. No.: 16/816,749

(22) Filed: Mar. 12, 2020

(65) Prior Publication Data

US 2020/0292291 A1    Sep. 17, 2020

Related U.S. Application Data

(60) Provisional application No. 62/817,123, filed on Mar. 12, 2019.

(51) Int. Cl.
| | | |
|---|---|---|
| *G01B 3/14* | (2006.01) |
| *A47H 1/10* | (2006.01) |
| *G01B 3/02* | (2020.01) |
| *G01V 9/00* | (2006.01) |

(52) U.S. Cl.
CPC .............. *G01B 3/14* (2013.01); *A47H 1/10* (2013.01); *G01B 3/02* (2013.01); *G01V 9/00* (2013.01)

(58) Field of Classification Search
CPC ................................ G01B 3/14; E04F 21/003
USPC .................................. 33/542, 563, 566, 194
See application file for complete search history.

(56) References Cited

U.S. PATENT DOCUMENTS

| | | | | |
|---|---|---|---|---|
| 2,647,325 A | * | 8/1953 | Little ...................... | E05B 17/06 33/667 |
| 2,992,488 A | * | 7/1961 | Berrett ................... | E04F 21/00 33/542 |
| 3,039,199 A | * | 6/1962 | Maag ..................... | E04F 21/003 33/667 |
| 3,274,692 A | * | 9/1966 | Morrison ................ | E04F 21/00 33/542 |
| 3,724,085 A | | 4/1973 | Wentworth | |
| 4,167,261 A | | 9/1979 | Bartels | |
| 4,329,783 A | * | 5/1982 | Maresca ................. | E04D 15/00 33/542 |
| 4,649,652 A | * | 3/1987 | Dickinson ............... | B25H 7/00 D10/64 |
| 4,791,731 A | | 12/1988 | Dickinson et al. | |
| 5,179,787 A | * | 1/1993 | Ostrowski ............... | A47H 1/10 33/528 |
| 5,222,303 A | | 6/1993 | Jardine | |
| 5,860,219 A | | 1/1999 | Wilkinson | |
| 6,810,598 B2 | | 11/2004 | Boys | |
| 6,842,993 B1 | | 1/2005 | DiMauro | |
| 6,866,082 B1 | | 3/2005 | Zahner | |
| 6,931,735 B1 | * | 8/2005 | Clark ..................... | A47H 7/00 33/194 |

(Continued)

*Primary Examiner* — Christopher W Fulton
(74) *Attorney, Agent, or Firm* — Dunlap Bennett & Ludwig, PLLC; Anna L Kinney

(57) ABSTRACT

A stud finder and template system are provided. The system has a template, and a stud finder. The template aligns with a corner of a window frame and has multiple evenly spaced holes. The stud finder has a housing, a handle, and a pin. A method of determining a location for a curtain bracket with the stud finder and template system is also provided. The template is positioned against a window frame. The stud finder is positioned against a hole in the template. The stud finder handle is depressed. A stud finder for use with a template is also provided. The stud finder has a front housing portion, a rear housing portion, an actuator handle, a pin, and a pin return spring.

9 Claims, 4 Drawing Sheets

(56) References Cited

U.S. PATENT DOCUMENTS

| | | | |
|---|---|---|---|
| 7,013,570 B2 * | 3/2006 | Levine | G01V 3/15 |
| | | | 324/67 |
| 7,269,912 B2 | 9/2007 | Muday et al. | |
| 7,487,818 B2 | 2/2009 | Zimmer | |
| 7,503,126 B2 | 3/2009 | Robins | |
| 8,099,878 B2 | 1/2012 | Guzallis | |
| 8,261,462 B2 | 9/2012 | Coyle | |
| 8,312,634 B1 * | 11/2012 | Forsyth | B25H 7/02 |
| | | | 33/562 |
| 8,539,691 B2 | 9/2013 | Daniel | |
| 9,067,314 B2 | 6/2015 | Frazer | |
| 9,151,585 B2 | 10/2015 | Sanchez | |
| 10,094,167 B2 | 10/2018 | Odish | |
| 10,448,773 B2 | 10/2019 | Muniz | |
| 2005/0011079 A1 | 1/2005 | Sikora, Jr. et al. | |
| 2005/0138826 A1 * | 6/2005 | Hsieh | G01V 9/00 |
| | | | 33/542 |
| 2009/0313838 A1 * | 12/2009 | Gross | E04F 21/0038 |
| | | | 33/194 |
| 2009/0313841 A1 * | 12/2009 | Calleros | G01B 1/00 |
| | | | 33/528 |
| 2011/0099826 A1 | 5/2011 | Chen | |
| 2016/0207118 A1 | 7/2016 | Broom | |
| 2018/0186029 A1 | 7/2018 | Bowerman et al. | |

* cited by examiner

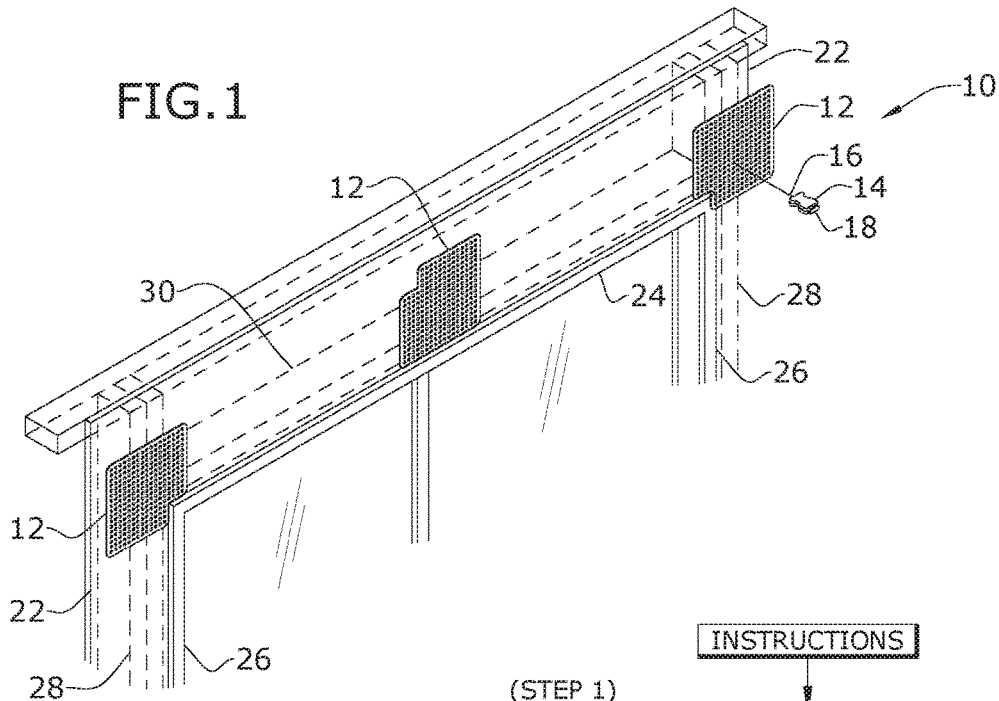

| INSTRUCTIONS |

(STEP 1) LINE UP THE EDGE OF THE TEMPLATE TO THE WINDOW EDGE AS SHOWN IN THE PICTURE.

(STEP 2) PLACE THE STUD FINDER IN THE HOLE AT THE DESIRED LOCATION.

(STEP 3) MAKE A TEST HOLE BY PUSHING THE HANDLE WHILE PUSHING THE SAFETY LOCK.

(STEP 4) IF THE PIN PENETRATES ENTIRELY IN THE DRYWALL, IT MEANS THERE IS NO STUD BEHIND IT. YOU CAN TEST ANOTHER HOLE CLOSER TO THE WINDOW TRIM TO FIND THE STUD. OTHERWISE, GO AHEAD AND MARK THE HOLE.

(STEP 5) FLIP THE TEMPLATE OVER AND USE IT ON THE OTHER SIDE OF THE WINDOW (REPEAT STEPS 3 AND 4).

(STEP 6) ON ONE FLAT SIDE OF THE TEMPLATE, POSITION CURTAIN ROD BRACKET WHERE CENTER BRACKET WILL BE HUNG (REPEAT STEPS 3 AND 4)

(STEP 7) DRILL THROUGH THE MARKS. INSTALL CURTAIN BRACKETS IN DRILLED HOLES DIRECTLY INTO THE STUD.

STUD CHECKER AND DRAPERY ROD HANGING TEMPLATE KIT

CROSS-REFERENCE TO RELATED APPLICATION

This application claims the benefit of priority of U.S. provisional application No. 62/817,123, filed Mar. 12, 2019, the contents of which are herein incorporated by reference.

BACKGROUND OF THE INVENTION

The present invention relates to a stud checker and, more particularly, to a stud checker configured for use with a drapery rod hanging template.

There are two challenges when installing curtain rods. The first challenge is marking the right location for screw holes. The second challenge is finding the stud behind the drywall to install the curtain brackets to make it sturdy. Installing curtain brackets after each move creates stress on an individual. No existing product provides both a template and stud finder.

As can be seen, there is a need for a system to easily find the same location to install curtain brackets on every window without using measuring tape and level and to find a stud to make the installation sturdy.

The present invention provides a stud finder and template system. The template has regularly interspaced holes to help find the location for mounting hardware, such as screws, with the same predetermined width and height every time. The pin or needle of the stud finder penetrates the dry wall to check if there is a stud behind that location. The stud finder and template system may also be used, for example, to hang blinds, to hang heavy picture frames, and to install handrails.

The template may generally be a flat, sturdy sheet of plastic with holes regularly spaced both vertically and horizontally. For example, the holes may be present every inch across and down the template. Every row may be marked so it is easy to find the same location for every window and on both sides of each window when installing a curtain bracket. The template is generally square or rectangular with a cutout to accommodate a window frame. The width and length may be a few inches to about a dozen inches, such as about 9"×9". Among other benefits, all the curtains in a home may be hung at the same height.

The inventive stud finder may be used with the template to make a tiny test hole to check if there is stud behind the drywall. If the location for the bracket is preselected and determined using the template, the stud finder allows the user to choose the right type of screws to be used for installation, including whether anchors will be needed. For heavy curtains, finding the stud plays an important role in making the installation strong enough to carry the weight of the curtains. Therefore, the stud finder may be used to make a series of tiny test holes at different locations marked by the template until the stud is found. The stud finder allows stud location without making unnecessary holes, particularly larger holes (e.g., with a drill bit), which require patching, sanding and painting.

SUMMARY OF THE INVENTION

In one aspect of the present invention, a stud finder and template system are provided, comprising a template, configured to align with a corner of a window frame, having a plurality of evenly spaced holes and a stud finder having a housing, a handle, and a pin.

In another aspect of the present invention, a method of determining a location for a curtain bracket is provided. The method comprises providing the stud finder and template system positioning the template against a window frame; positioning the stud finder against a hole in the template; depressing the handle; and, if the handle depresses fully, moving the stud finder to an adjacent hole and depressing the handle again.

In yet another aspect of the present invention, a stud finder for use with a template is provided. The stud finder comprises a front housing portion; a rear housing portion; an actuator handle; a pin; and a pin return spring.

These and other features, aspects and advantages of the present invention will become better understood with reference to the following drawings, description and claims.

BRIEF DESCRIPTION OF THE DRAWINGS

FIG. 1 is a perspective view of a bracket hanging system according to an embodiment of the present invention, shown in use;

FIG. 11 is a flow chart of a method according to an embodiment of the invention.

DETAILED DESCRIPTION OF THE INVENTION

Figure 2:
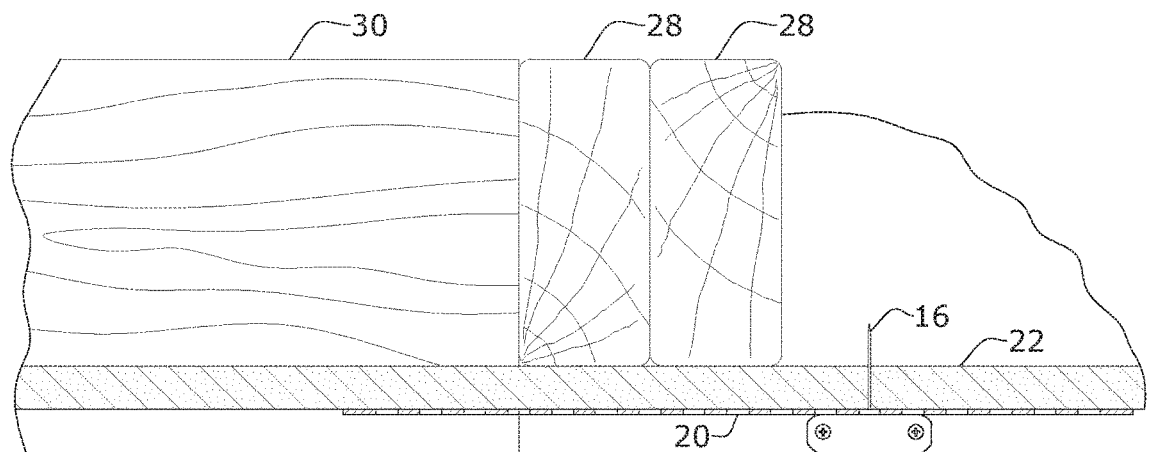
FIG. 2 is a sectional view of the bracket hanging system of FIG. 1, shown in use at a location without a stud.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, one embodiment of the present invention is a template and stud finder system. The template comprises a flat, sturdy sheet of plastic approximately the shape of a square with an L-shaped cutout at one corner. The template may have holes at regularly spaced intervals both vertically and horizontally. The stud finder comprises a housing having a front cover and a back cover with a pin or needle housed within. The housing may have an opening through which the needle may extend. The housing may protrude around the opening to form a protrusion or nipple. The needle may have a head to anchor the needle within a handle and/or the housing. The head may be, for example, from ⅛ the length of the needle to ⅓ the length of the needle. The needle may also be positioned in the center of a coiled spring. A handle may extend from the housing opposite the needle. The stud finder may also have a safety lock button. The safety lock button may be provided with a coiled spring to return the safety lock button from an unlocked position to a locked position when not in use.

In order to use the template and stud finder system, a user may line up the edge of the template to a window frame corner, e.g., at an edge intersecting the trim and the wall, and may select a hole marking the desired height and horizontal distance from the window frame. To determine whether a stud is behind the selected location, the user may place the protruding portion of the housing within the selected hole. The stud finder may be activated by pressing the handle on the housing. In some embodiments, the safety lock button may be pressed at the same time as the handle is pressed, releasing the needle. As the handle is pressed, the needle is driven through the drywall. When the stud finder is removed from the wall and the template, the spring surrounding the needle returns the needle and the handle to a neutral position. If a stud is present, the stud finder needle will not fully extend. If the initial test location is satisfactory, the user may mark the location for later installation of the support bracket. If a stud is not present at the selected location but will be necessary to support a bracket, the stud finder may be moved to a hole to the left or right and activated again. This action may be repeated until a stud is found. In many cases, the second test hole may be made closer to the edge of the window. The user may then align the opposite side of the template with the other corner of the window and repeat the steps above.

In some embodiments, the needle may be spring loaded so that when the handle is depressed and/or the safety lock button is released, a spring drives the needle through the hole in the template and into the wallboard.

Referring to FIGS. 1-11, FIG. 1 illustrates the inventive system in use. As shown in FIG. 1, the system 10 includes a template 12 and a stud finder 14. The template 12 may be placed at one upper corner of a window frame to determine the mounting position vertically for a bracket. The stud finder 14 may be used with the template 12 to determine the horizontal mounting position for the bracket by inserting a pin 16 of the stud finder 14 through a hole in the template 12 and activating the stud finder 14.

Figure 3:
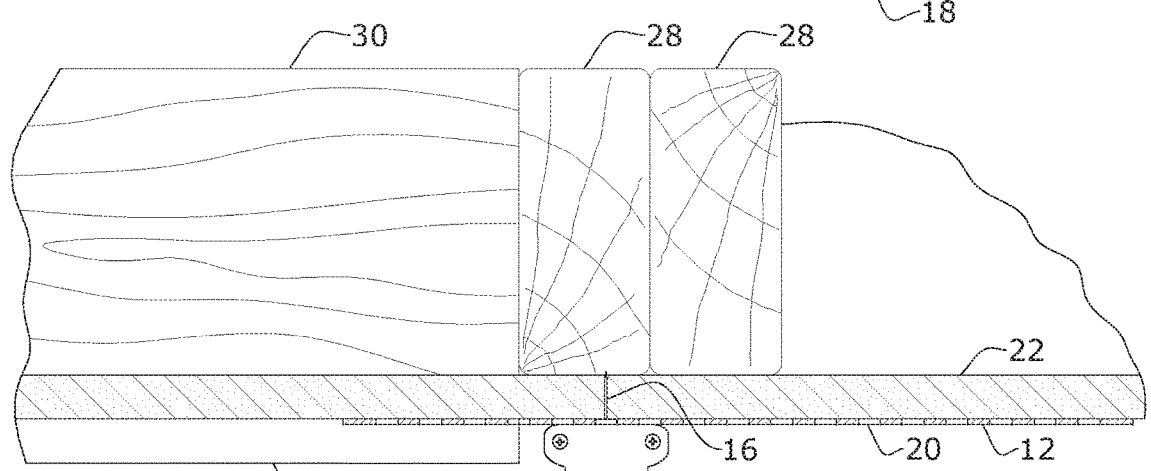
FIG. 3 is a sectional view of the bracket hanging system of FIG. 1, shown in use at a location with a stud.

FIGS. 2 and 3 illustrate use of the stud finder. The template 12 may be placed against drywall 22 at a corner of a top window frame 24, which may be secured to a header stud 30. A hole alignment nipple 46 of the stud finder 14 may be inserted into a hole 20 of the template 12 and the pin 16 may protrude when the handle 18 is pressed while releasing a safety lock button 36. If no stud 28 is present behind the selected hole 20, the handle 18 will depress completely. If a stud 28 is present behind the selected hole 20, the handle will not depress completely.

Figure 4:
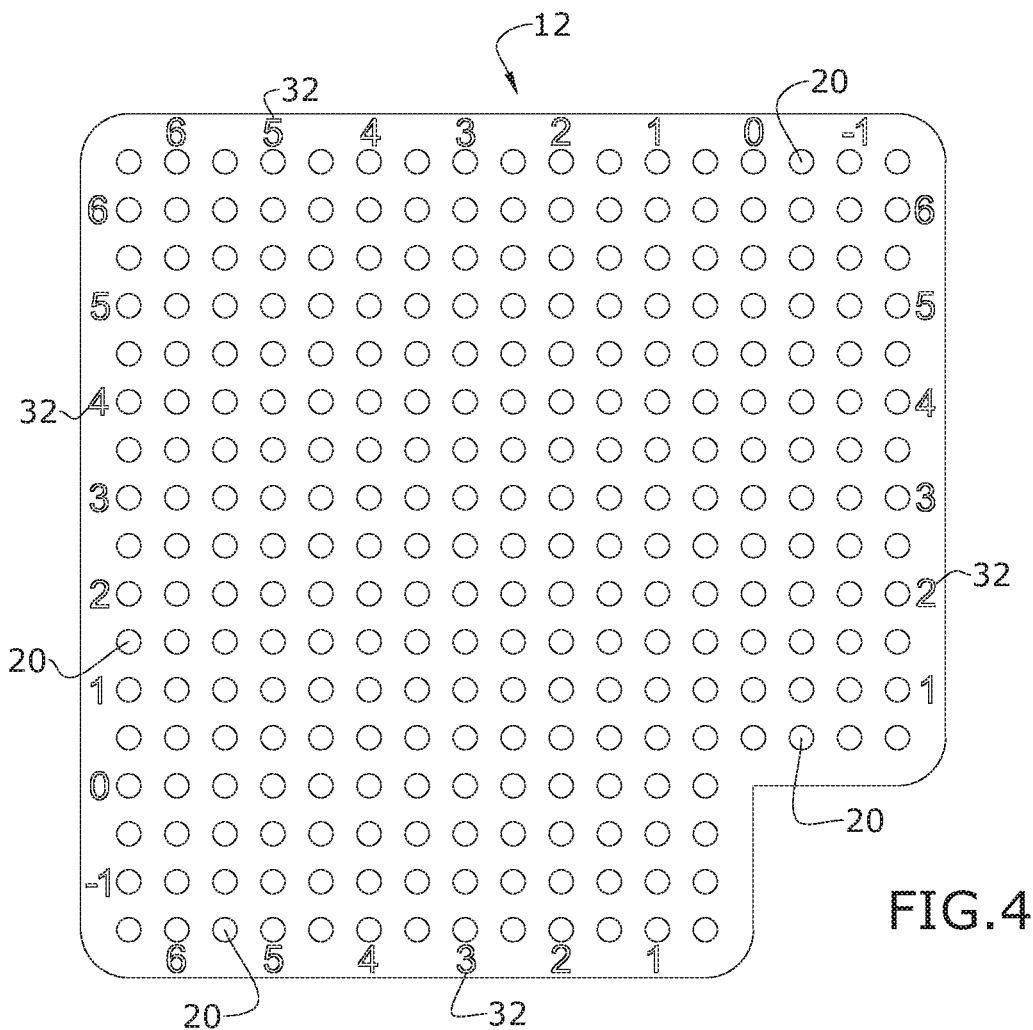
FIG. 4 is a front view of the template of FIG. 1.
Figure 5:
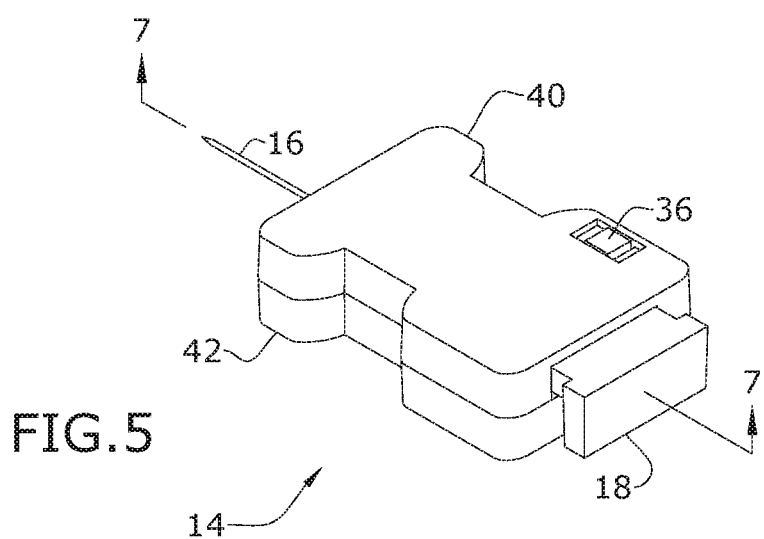
FIG. 5 is a perspective view of the stud finder of FIG. 1.
Figure 7:
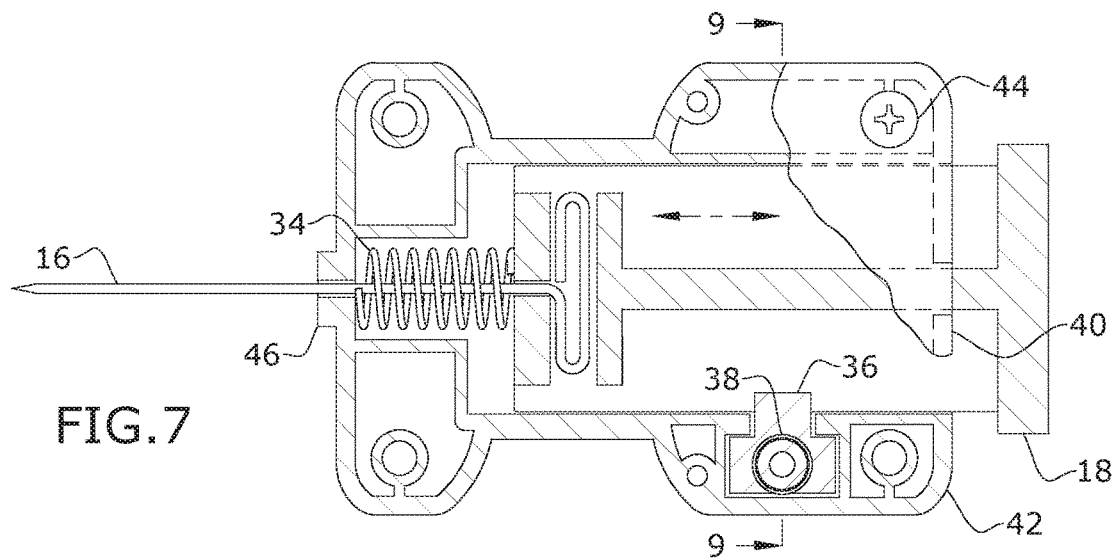
FIG. 7 is a sectional view of the stud finder of FIG. 5, taken along line 7-7.
Figure 6:
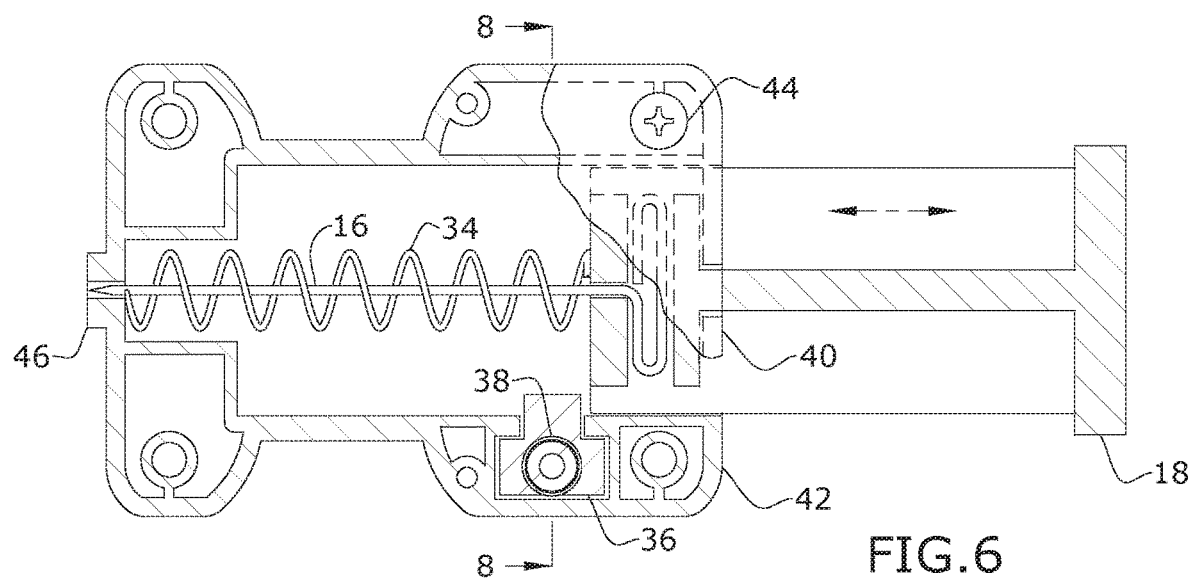
FIG. 6 is a sectional view of the stud finder of FIG. 5, shown in retracted position.
Figure 8:
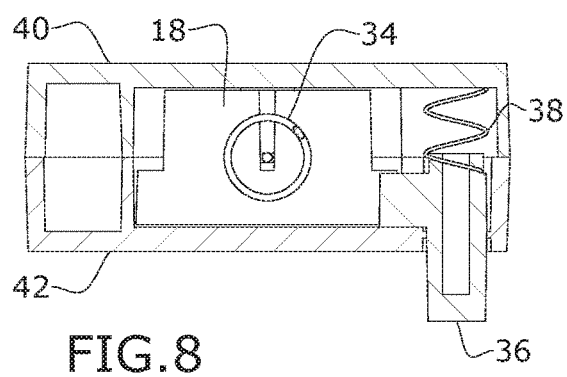
FIG. 8 is a sectional view of the stud finder of FIG. 6, taken along line 8-8.
Figure 9:
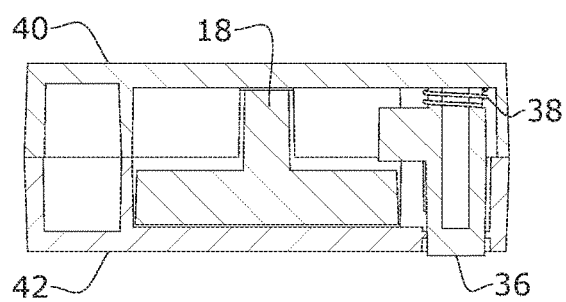
FIG. 9 is a sectional view of the stud finder of FIG. 7, taken along line 9-9.

FIG. 4 illustrates the template 12 in more detail. The template 12 may generally have a square shape with rounded corners and a cutout to accommodate the corner of a window frame. The template 12 may be provided with a plurality of measurement notations 32 and a plurality of evenly spaced holes 20 for use with the stud finder 14. The measurement notations 32 may identify columns and rows of holes 20.

Figure 10:
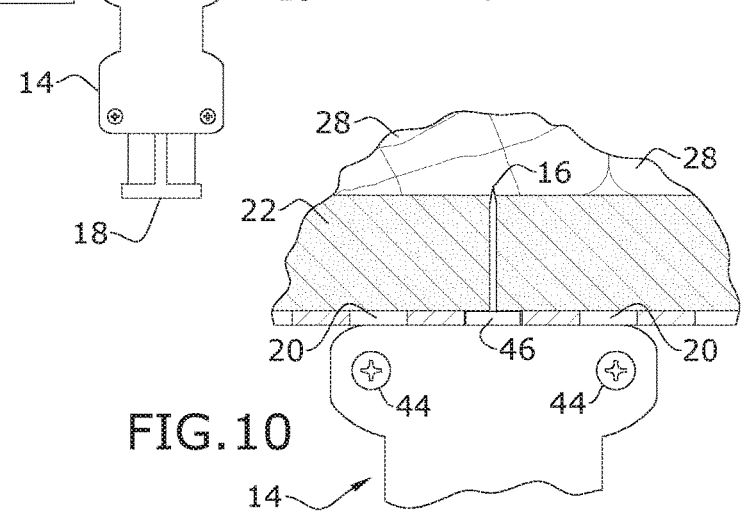
FIG. 10 is an enlarged detail view illustrating a hole alignment nipple.

FIGS. 5 through 9 illustrate the structure of the stud finder 14. The stud finder 14 is provided with a pin 16 that may protrude from the housing including a front cover 40 and a back cover 42 when the handle 18 is depressed while the safety lock button 36 is released. The spring 34 urges retraction of the pin 16, and the spring 38 urges the safety lock button 36 back to its initial position, when the handle 18 is released. The stud finder front cover 40 and the stud finder back cover 42 may be held in place with screws 44. The stud finder housing 40, 42 may further feature a hole alignment nipple 46 for alignment with holes 20 in the template 12 as illustrated in FIG. 10.

FIG. 11 provides method steps for use of the template 12 and the stud finder 14, according to an embodiment of the invention. As shown, Steps 1 through 3 include positioning the template 12, inserting the stud finder 14 into a hole 20, and depressing the handle 18 and the safety lock button 36. As discussed in Step 4, if no stud 28 was found, the stud finder 14 may be moved to an adjacent hole 20 and activated again. Step 5 discloses that the template 12 may be turned over for use against the opposing corner of the window frame 24, 26. As shown in Steps 6 and 7 after use of the stud finder 14 and template 12 system 10, the user may position a bracket in a position marked using the system 10 and a hole may be drilled through the marks.

It should be understood, of course, that the foregoing relates to exemplary embodiments of the invention and that modifications may be made without departing from the spirit and scope of the invention as set forth in the following claims.

What is claimed is:

1. A stud finder for use with a template, comprising:
    a) a housing having a front housing portion and a rear housing portion;
    b) an actuator housed within and extending from the housing;
    c) a pin fixed to the actuator, wherein the pin protrudes from the housing when the actuator is depressed;
    d) a pin return spring abutting the actuator and operative to urge the pin into a retracted position;
    e) a safety lock button extending from the housing and configured to release the pin from the retracted position when the safety lock button is depressed; and
    f) a safety lock button return spring coupled to the safety lock button and operative to urge the safety lock button into a locked position.

2. A stud finder and template system for positioning brackets, comprising:
    a) a template, configured to align with a corner of a window frame, having a plurality of evenly spaced holes; and
    b) the stud finder of claim 1.

3. The stud finder and template system of claim 2, wherein the template further comprises measurement markings identifying the plurality of evenly spaced holes in rows and columns.

4. The stud finder and template system of claim 2, wherein the template is characterized by a rounded-corner square shape with an L-shaped cutout at one corner.

5. A method of determining a location for a curtain bracket, comprising:
    a) providing the stud finder and template system of claim 2;
    b) positioning the template against a corner of a window frame;
    c) positioning the stud finder against a hole in the template; and
    d) depressing the actuator.

6. The method of claim 5, wherein if the actuator depresses fully, the method further comprises moving the stud finder to an adjacent hole and depressing the actuator again until the actuator does not depress fully, indicating a stud is present.

7. The method of claim 5, wherein the method further comprises reversing the template and positioning the template against an opposing corner of the window frame.

8. The stud finder of claim 1, wherein the front housing portion and the rear housing portion together form a protruding portion with an opening, wherein the opening is configured to allow the pin to extend through the opening, and wherein the protruding portion is configured to fit into a hole in a template.

9. The stud finder of claim 1, wherein the pin further comprises a head fixed to the actuator.

\* \* \* \* \*